United States Patent
D'Angelo

(10) Patent No.: US 10,902,712 B2
(45) Date of Patent: Jan. 26, 2021

(54) SURVEILLANCE DEVICE

(71) Applicant: Fabio D'Angelo, San Benedetto del Tronto (IT)

(72) Inventor: Fabio D'Angelo, San Benedetto del Tronto (IT)

( * ) Notice: Subject to any disclaimer, the term of this patent is extended or adjusted under 35 U.S.C. 154(b) by 0 days.

(21) Appl. No.: 16/343,861

(22) PCT Filed: Dec. 15, 2016

(86) PCT No.: PCT/EP2016/081133
§ 371 (c)(1),
(2) Date: Apr. 22, 2019

(87) PCT Pub. No.: WO2018/108273
PCT Pub. Date: Jun. 21, 2018

(65) Prior Publication Data
US 2019/0244505 A1    Aug. 8, 2019

(51) Int. Cl.
| | | |
|---|---|---|
| *G08B 25/00* | (2006.01) | |
| *G08B 19/00* | (2006.01) | |
| *H04W 4/029* | (2018.01) | |
| *G08B 25/01* | (2006.01) | |
| *G08B 25/06* | (2006.01) | |
| *H04N 7/18* | (2006.01) | |
| *G08B 25/08* | (2006.01) | |
| *G08B 13/00* | (2006.01) | |
| *G08B 13/18* | (2006.01) | |

(52) U.S. Cl.
CPC .......... *G08B 19/00* (2013.01); *G08B 19/005* (2013.01); *G08B 25/00* (2013.01); *G08B 25/014* (2013.01); *G08B 25/06* (2013.01); *H04N 7/188* (2013.01); *H04W 4/029* (2018.02); *G08B 13/00* (2013.01); *G08B 13/18* (2013.01); *G08B 25/08* (2013.01)

(58) Field of Classification Search
CPC ........ G08B 13/00; G08B 13/13; G08B 25/00; G08B 25/008; G08B 27/001
See application file for complete search history.

(56) References Cited

U.S. PATENT DOCUMENTS

| | | | |
|---|---|---|---|
| 2012/0327242 A1 | 12/2012 | Barley et al. | |
| 2014/0313032 A1* | 10/2014 | Sager ................. | G06F 3/04842 340/539.17 |
| 2015/0049191 A1* | 2/2015 | Scalisi ............... | H04M 1/0291 348/143 |

FOREIGN PATENT DOCUMENTS

JP      2018029237 A   *   2/2018      ............. G08B 21/00

OTHER PUBLICATIONS

International Search Report for PCT/EP2016/081133.

* cited by examiner

*Primary Examiner* — Benyam Haile
(74) *Attorney, Agent, or Firm* — Egbert, McDaniel & Swartz, PLLC

(57) ABSTRACT

A surveillance device includes: an electrical power supply system configured to be connected directly to an electrical mains system, a communication system configured to communicate with an operating center and/or with user devices, occupancy sensors configured to detect an intrusion in a surveillance area where the surveillance system is installed, cameras configured to record images in the surveillance area, an alarm configured to generate an acoustic and/or luminous alarm; and a control unit connected to the electrical power supply system, communication system, occupancy sensors, cameras and alarm.

11 Claims, 1 Drawing Sheet

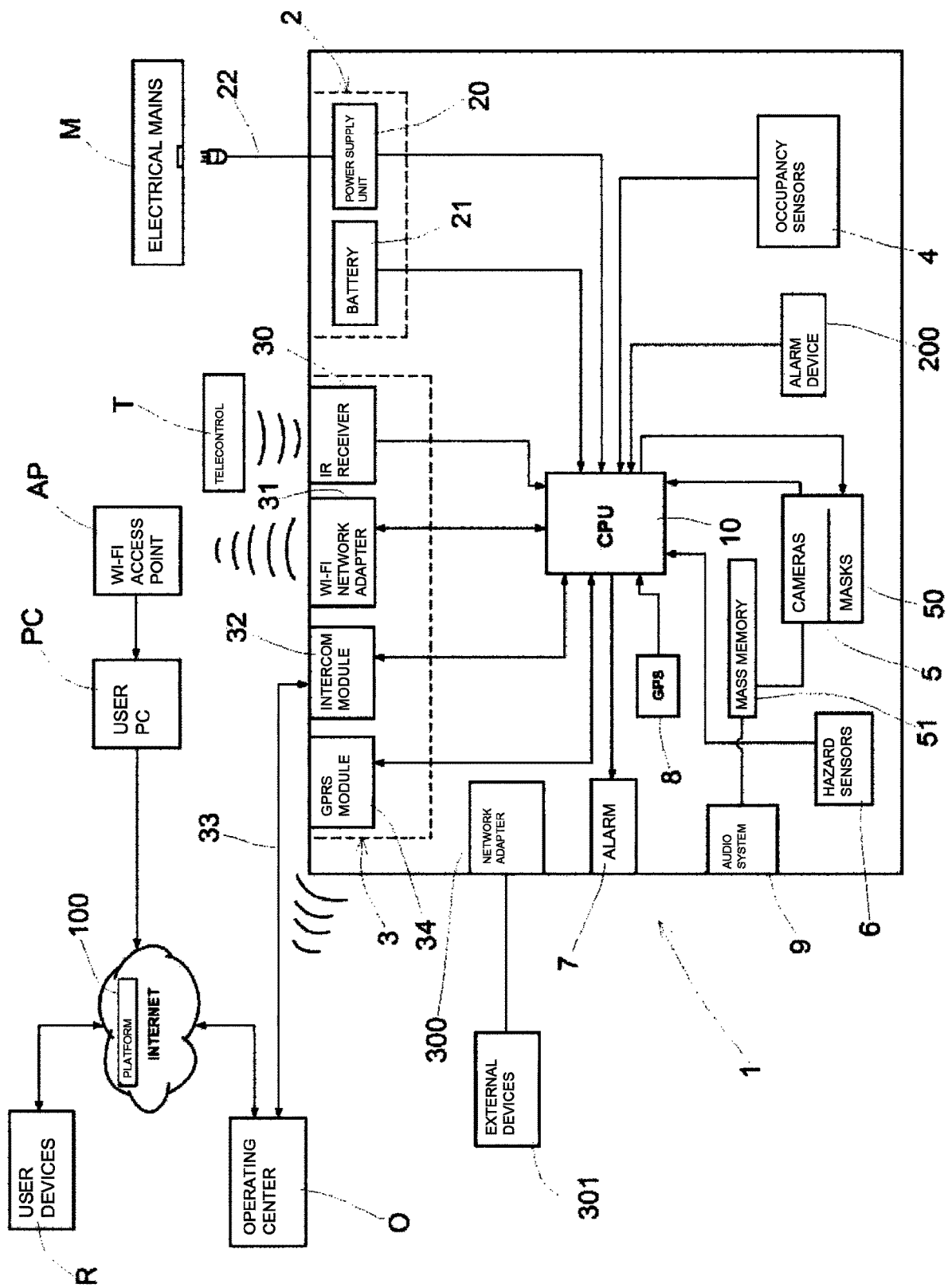

SURVEILLANCE DEVICE

The present application for utility model relates to a surveillance device.

Various types of surveillance/anti-intrusion devices are known on the market, which are provided with different types of occupancy sensors intended to detect the intrusion of a stranger in a surveillance area. This type of surveillance devices is very limited because they do not allow for inspecting the area visually.

Video surveillance devices are known, which comprise a plurality of cameras disposed in such a way to record images in a surveillance area. However, the video surveillance devices of the prior art are impaired by some drawbacks because they are not versatile, not flexible, complicated and difficult to use. Moreover, they are impaired by the high number of false signaling caused by undistinguishable brightness variations.

Consequently, the user is generally forced to purchase multiple surveillance devices, which are structurally different and incompatible, with complications in terms of assembling, programming, and managing the various surveillance devices.

Moreover, the video surveillance devices of the prior art are not provided with protocols that permit a private surveillance service to receive the alarms or images automatically and to activate predefined assistance and emergency services.

The purpose of the present innovation is to disclose a single device that contains all necessary technologies to provide surveillance, inspection and emergency services, as well as to exchange information with operating centers in order to deliver professional security and emergency services.

Another purpose of the present innovation is to disclose a single device that can be automatically connected with an authorized operating center without the user's intervention in order to be immediately in operation when it is switched-on for the first time, without the need of any technical installation procedure.

An additional purpose of the present innovation is to eliminate the drawbacks of the prior art, by disclosing a surveillance device that is reliable, versatile, flexible, effective and efficacious.

Another purpose of the present innovation is to disclose such a surveillance device that is capable of providing multiple functions in a single device and is easy to install and operate.

These purposes are achieved according to the innovation with the characteristics indicated in the attached independent claim 1.

Advantageous embodiments appear from the dependent claims.

The surveillance device of the invention comprises:
- an electrical power supply system intended to be directly connected to an electrical mains system,
- a communication system intended to communicate with an operating center and/or with user devices,
- occupancy sensors intended to detect an intrusion in a surveillance area where the surveillance device is installed,
- an alarm device intended to be activated by the user to send alarm signals,
- an alarm intended to generate an acoustic and/or luminous alarm,
- cameras intended to record images in said surveillance area,
- an audio system intended to make audio recordings in real time in the surveillance area,
- a mass memory to store the video and audio recordings made by the cameras and by the audio recording device, and
- a control unit connected to said electrical power supply system, communication system, occupancy sensors, alarm device, alarm, cameras, and audio system.

The control unit is configured and programmed in such manner that, if an intrusion is detected by the occupancy sensors or if the alarm device is activated by the user, the control units sends an alarm signal to at least one user device and/or to the operating center, the alarm is activated, the cameras start recording images in the surveillance areas and the audio system records acoustic signals in the surveillance area.

Additional features of the innovation will appear manifest from the detailed description below, which refers to a merely illustrative, not limiting embodiment, as illustrated in the attached figures, wherein:

FIG. 1 is a block diagram of the surveillance device according to the invention.

With reference to FIG. 1, the surveillance device of the invention is described, which is generally indicated with reference numeral (1).

The surveillance device (1) has a control unit (10) that is used to manage the components of the surveillance device.

The surveillance device (1) comprises an electrical power supply system (2) to electrically power all the electrical components of the device. The electrical power supply system (2) comprises a power supply unit (20) provided with an electrical cable (22) with a plug intended to be connected to a socket of the electrical mains system (M). In case of electrical failure, the electrical power supply system (2) also comprises a battery (21) intended to power the electrical components. The battery (21) can be of rechargeable type and is recharged by the power supply unit (20).

The surveillance device (1) comprises a communication system (3) to communicate with a user and with an operating center (O) that manages the surveillance service provided by the surveillance device (1).

The communication system (3) comprises a receiver (30), such as an IR receiver, to receive commands from a remote control (T) provided to the user. The remote control (T) can be a mobile telephone that acts as a remote control or a radio control. The remote control (T) can be also used to send alarm signals in case of theft, robbery and/or health emergency to the operating center (O) by means of the surveillance device (1).

In addition to or in replacement of the receiver (30), the surveillance device can be provided with buttons or with a touchscreen display to let the user control the surveillance device (1) and send alarm signals to the operating center (O).

The communication system (3) comprises a network adapter (31) for connection to the Internet in such manner to send messages or emails to the operating center and to user remote communication devices (R) connected to the Internet. For example, the user remote communication devices (R) can be computers, tablets, smart-phones and the like.

In particular, on the Internet there is a Web site managed by a software platform (100) for managing the surveillance device (1). In such manner, by connecting to the software platform (100), the operating center (O) receives information from the surveillance device (1). Similarly, the user can access the software platform (100) by means of the remote communication devices (R) to receive information from the surveillance device and manage the surveillance device from remote.

Advantageously, the network adapter (31) is a WI-FI network adapter that is connected to a user access point (AP) connected to a personal computer (PC) of the user with an Internet connection.

The communication system (3) also comprises an intercom module (32) connected to the operating center (O) with a direct audio and data line (33).

Optionally, the communication system (3) can comprise a mobile telephone communication module (34), such as a GPRS module or the like, to communicate with the Internet or directly with the operating center (O) and the user remote devices (R).

The surveillance device (1) comprises occupancy sensors (4) intended to detect the presence of an intruder in the surveillance area. The occupancy sensors (4) can be volumetric sensors, ultrasound radars, infrared sensors, optical sensors and the like.

The surveillance device (1) comprises cameras (5) intended to record images in the surveillance area and detect audio in the surveillance area. The cameras (5) can be motorized night vision cameras that can be oriented by 360° with commands given by the user or by the operating center. The cameras comprise masks (50) to prevent them from recording when the user is in the surveillance area.

The surveillance device (1) comprises a mass memory (51) connected to the cameras (5) to store the video/audio recordings made by the cameras. The mass memory can be a solid state driver (SSD).

Optionally, the surveillance device (1) can comprise hazard sensors (6) intended to detect a hazard in the surveillance area. The hazard sensors (6) can be fire sensors, smoke sensors, gas sensors, flood sensors, and the like.

The surveillance device (1) comprises an acoustic and/or optical alarm (7) such as, for example, a buzzer and/or a luminous signaling, in order to signal an intrusion.

Optionally, the surveillance device (1) can comprise a geolocation system (8) such as, for example, a GPS module, intended to detect the position of the surveillance device (1).

The surveillance device (1) comprises an alarm device (200) intended to be activated by the user to send alarm signals in case of robbery, assault, health emergency, assistance request and help call. The alarm device (200) is connected to the CPU. In such manner, when the user activates the alarm device (200), by means of the communication system (3) an alarm signal is sent to the operating center (O) that activates the intervention procedures.

The surveillance device (1) has an audio system (9) intended to make audio recordings in real time that are stored in the memory (51). The audio system (9) can play sounds recorded in the memory (51). For example, the audio system can play an alarm sound, such as a siren. In this case the alarm (7) can be integrated in the audio system (9).

The audio system (9) can operate in handsfree mode, when it is used for communicating with the operating center (33) by means of intercom module (32) and direct line (33).

The audio system (9) can generate voice activated commands. Voice activated commands are operations made by the system when it receives a preset voice command by means of the internal microphone (for example, by pronouncing the word "HELP", the audio system activates a hazard signaling that is sent to the operating center). Such a function is mainly provided for anti-theft, anti-assault, health emergency services, already activated by the system manually by means of the remote control (T), the alarm device (200) or a Web application on the Internet.

All the aforementioned functions, both with voice activation by means of the audio system (9) and with manual activation by means of the remote control (T) or the alarm device (200), are always active, also when the surveillance device (1) is in standby mode.

The surveillance device can comprise logical adapters (inputs/outputs) (300) for managing external devices (301) such as, for example, pre-existing alarm systems, telecontrols, teleactivations, domotics systems, and the like.

The surveillance device (1) operates both in individual mode and in scalable mode connected to other surveillance devices (1). When multiple surveillance devices (1) are connected, a surveillance device operates in MASTER mode and the other surveillance devices operated in SLAVE mode.

As mentioned above, all electrical components (2, 3, 4, 5, 6, 7, 8, 9, 200) of the surveillance device (1) are electrically connected to the control unit (10) that electrically powers and manages said electrical components.

The software platform (100) controls all devices (2, 3, 4, 5, 6, 7, 8 and 9) of the surveillance device (1) and manages the information flows, translating them into a language that can be understood by the user and re-addressing them towards the user devices (R) or the operating center (O), according to the type of information received.

The surveillance device (1) revolutionizes the approach to the private surveillance sector and promotes the use of surveillance devices and services both in the domestic and the commercial sector thanks to a rapid and extremely flexible system.

Said surveillance device (1) provides for the software platform (100) that interacts with the hardware of all devices (2, 3, 4, 5, 6, 7, 8, 9 and 200) of the surveillance device (1). The operating center (O) is always active. The marketing system of the surveillance device (1) is innovative and promotes the simple, inexpensive and capillary diffusion of the surveillance device (1).

In addition to being used in small or large domestic or commercial environments, thanks to the provision of a geolocation system (8), the surveillance device (1) can be installed also in mobile vehicles, such as cars, trucks, caravans, boats, etc.

The surveillance device (1) and the associated surveillance service can be purchased by means of the large distribution channels, including the Internet, with delivery of the surveillance device and activation of the surveillance service, which comprises a video surveillance anti-intrusion system over a period of time ranging from 24 to 36 hours.

The surveillance device (1) is simple, preconfigured and can be immediately operated by simply connecting the plug to the electrical mains system. The surveillance device is compact, aesthetically pleasant, and is provided with technologies that allow to:

detect a presence by means of the occupancy sensors (4), send alarms when a presence is detected in the surveillance area by means of the alarm (7) and the communication system (3),
display images with the motorized cameras (5) connected to the mass memory (51);
interrogate the surveillance device (1) by means of the communication system (3) in order to detect its status, existence and correct operation;
send a signaling in case of network failure and/or tampering;
connect through the intercom module (32) in order to communicate with the operating center (O) in a private mode (with audio amplification) (O) to request surveillance, health and similar services;

signal the position of the surveillance device (1) through the use of the geolocation system (8).

The surveillance device (1) is provided with a masking system of the cameras (5), by means of masks (50), which ensures total privacy when the user is in the surveillance area.

Considering that the surveillance device (1) comprises a network adapter (31), a surveillance system can be created with multiple surveillance devices (1) connected to a local network. In this way, a surveillance device (1) can operate as master and the other surveillance devices (1) can operate as slave.

The surveillance device (1) uses two technologies for connecting with the operating center (O) and the user remote devices (R), interrogating the surveillance device from the operating center (O) and the user remote devices (R) and sending alarm signals and images from the surveillance devices (1) to the operating center (O) and the user remote devices (R). The first technology is based on a WI-FI user network (if available in the area where the surveillance device is installed).

The second technology is based on an integrated data communication system that provides for the intercom module (32) directly connected with the operating center (O).

The surveillance device (1) is preconfigured and activated in such manner that the user can immediately use it by simply connecting the plug of the cable of the device into the socket of the electrical mains system.

The software platform (100) has been developed in order to use the surveillance device (1), and allows the user to purchase and manage the surveillance device (100) and the associated surveillance service directly. The user can manage the surveillance device (1) by means of a software application installed in a user communication device, or by accessing a dedicated Web site over the Internet.

The user must register through a Web site managed by the software platform (100) to choose the desired surveillance and/or assistance service. The purchase of the service and the registration over the Web site allows for immediately activating the shipment of the surveillance device (1) and the consequent activation of the requested surveillance services.

By means of the communication system (3), the registered user can access and use the surveillance device (1) by connecting to the Web site with an application installed in the user computer, tablet or smartphone.

The control unit (10) of the surveillance device is configured in such manner to send an alert message and/or email to the registered user every time a user accesses the surveillance device (1). In such manner the user can check non-authorized access attempts, if any.

The user can activate and request the following services:

a) direct management of the surveillance device (1) in order to receive alarms in case of intrusion detected by the occupancy sensors (4) and to access the images recorded by the cameras (5);

b) reception of alarms by the operating center (O) (this function is very useful when the user is away from his or her house);

c) video inspection service with cameras (5) in case of intrusion detected by the occupancy sensors (5) and alarm signaling;

d) activation for sending a patrol connected over the radio with the operating center (O) by surveillance services on site and for requesting the police intervention in case of burglary as indicated by (b) and (c);

e) deposit of keys at the surveillance service when the user is away from his or her house in order to permit the necessary inspections;

f) first aid service by means of the intercom module (32) and the audio system (9) in case of health emergency.

By accessing the software platform (100), the user can activate or deactivate the connection with the operating center (O) at any time and/or request additional services.

The basic service provides for the use of the surveillance device (1), which is provided as gratuitous loan and shipped following to the payment of a small activation fee.

The subscription service provides for:

using a surveillance device (1);

network traffic up to 1 GB;

checking the status of the surveillance device.

The customer can expand his or her surveillance system with additional devices connected in network configuration with the surveillance device (1) that operates as master.

Through the basic service the user can use and manage the surveillance device (1) in full autonomy, freely accessing the images recorded by the cameras (5) and directly receiving the alarm signals on the devices indicated during the registration procedure, such as telephone numbers and/or email addresses where to send the alarm signal.

If the user does not deactivate the alarm or does not acknowledge the anti-theft and/or health emergency alarm within 60 seconds, the surveillance device (1) will automatically send the alarm to the operating center (O), which in turn will activate the predefined procedures:

1. it will call the telephone number of the place where the surveillance device (1) is installed and all the telephone numbers informed by the user;
2. in case of no answer, the operating center (O) will be authorized to access the images recorded by the cameras (5) and check whether burglary is in progress;
3. in case of burglary, the operating center (O) will inform the police, and a private surveillance service, if included in the contract with the customer.

Upon request from the customer, the flexible service provides for a set of additional services for short periods of time in which the customer is away from his or her house, such as:

immediate access to the images recorded by the cameras (5) in case of alarm, video inspections programmed over 24 hours;

night patrolling by security guards;

deposit of keys with the security guards before leaving the house;

fixed surveillance of the house by the security guards.

Numerous variations and modifications can be made to the present embodiment of the innovation, which are within the reach of an expert of the field, falling in any case within the scope of the innovation as disclosed by the attached claims.

The invention claimed is:

1. A surveillance system comprising:
an operating center;
at least one user device; and
a surveillance device separate from and in communication with the operating center and the at least one user device, the surveillance device comprising:
an electrical power supply system adapted to be connected directly to an electrical mains system;
a communication system configured to communicate with the operating center or with the at least one user device, said communication system comprising an intercom module connected to the operating center by a direct data and audio line;

a plurality of occupancy sensors configured to detect an intrusion in a surveillance area in which the surveillance device is installed;

an alarm device configured to be activated by a user so as to send alarm signals;

an alarm configured to admit an acoustic alarm or a luminous alarm;

at least one camera configured to record video images or audio in the surveillance area;

an audio system configured to record the audio in realtime in the surveillance area;

a mass memory connected to said at least one camera and to said audio system so as to store the video images and the audio from said at least one camera and the recorded audio from said audio system;

a control unit connected to said electrical power supply system, said communication system, said plurality of occupancy sensors, said at least one camera, said alarm device, said audio system and said alarm, wherein an alarm signal is sent to the at least one user device or to the operating center and said alarm is activated and said at least one camera records the video images in the surveillance area and the audio system records the audio in the surveillance area when said plurality of occupancy sensors detect the intrusion or when said alarm device is activated by the user;

a plurality of masks activatable by the user in order to mask the at least one camera so as to prevent said at least one camera from recording when the user is in the surveillance area; and a a GPS module connected to said control unit and configured to detect a geographical position of the surveillance system, said GPS module being integrated into the surveillance device.

2. The surveillance system of claim 1, wherein said electrical power supply system comprises a power supply connected to the electrical mains system and a battery connected to the power supply.

3. The surveillance system of claim 1, wherein said communication system comprises a receiver coupled to a remote control used by the user to enter command signals.

4. The surveillance system of claim 1, wherein said communication system comprises a receiver coupled to a button panel used by the user to enter command signals.

5. The surveillance system of claim 1, wherein said communication system comprises a receiver coupled to a touchscreen display used by the user to enter command signals.

6. The surveillance system of claim 1, wherein said communication system comprises:

a network adapter connected to a local network of a personal computer of the user so as to connect to the Internet.

7. The surveillance system of claim 6, wherein said network adapter is a Wi-Fi network adapted to connected to a user Wi-Fi access point.

8. The surveillance system of claim 1, wherein said communication system comprises:

a cellular telephone communication module that communicates with the operating center or with the at least one user device.

9. The surveillance system of claim 1, wherein said plurality of occupancy sensors is selected from the group consisting of volumetric sensors, infrared sensors, ultrasound radar and optical sensors.

10. The surveillance system of claim 1, further comprising:

a plurality of hazard sensors connected to said control unit, said plurality of hazard sensors configured to detect a hazard in the surveillance area.

11. The surveillance system of claim 10, wherein said plurality of hazard sensors is selected from the group consisting of fire sensors, flame sensors, smoke sensors, gas sensors and flood sensors.

* * * * *